UNITED STATES PATENT OFFICE.

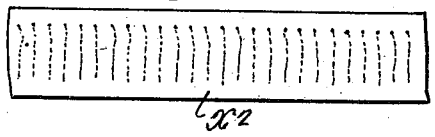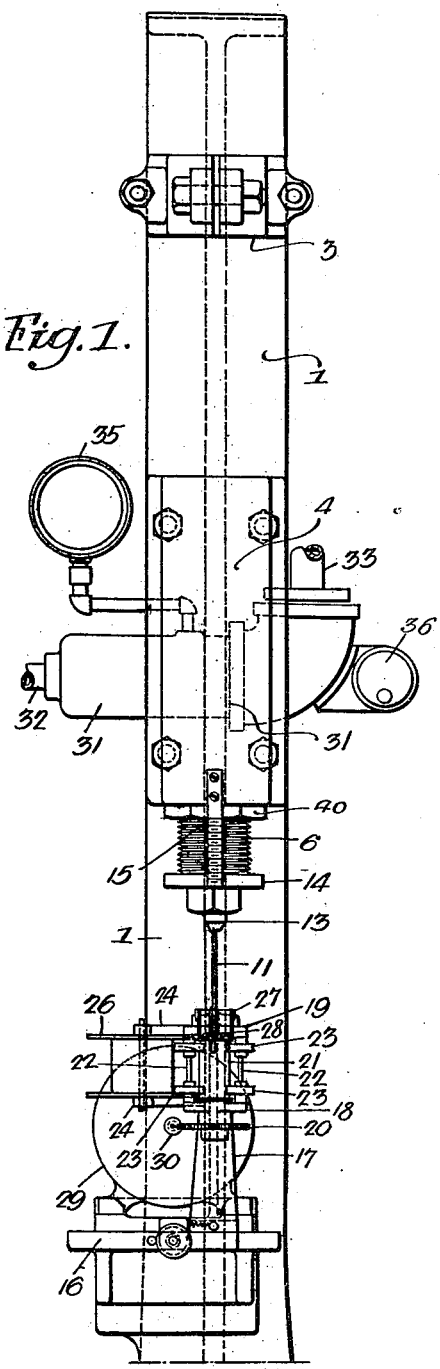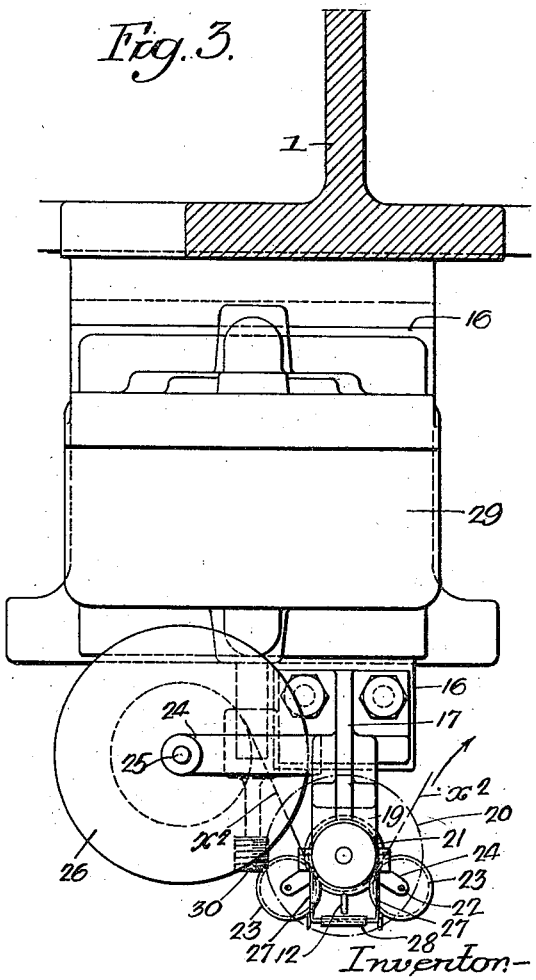

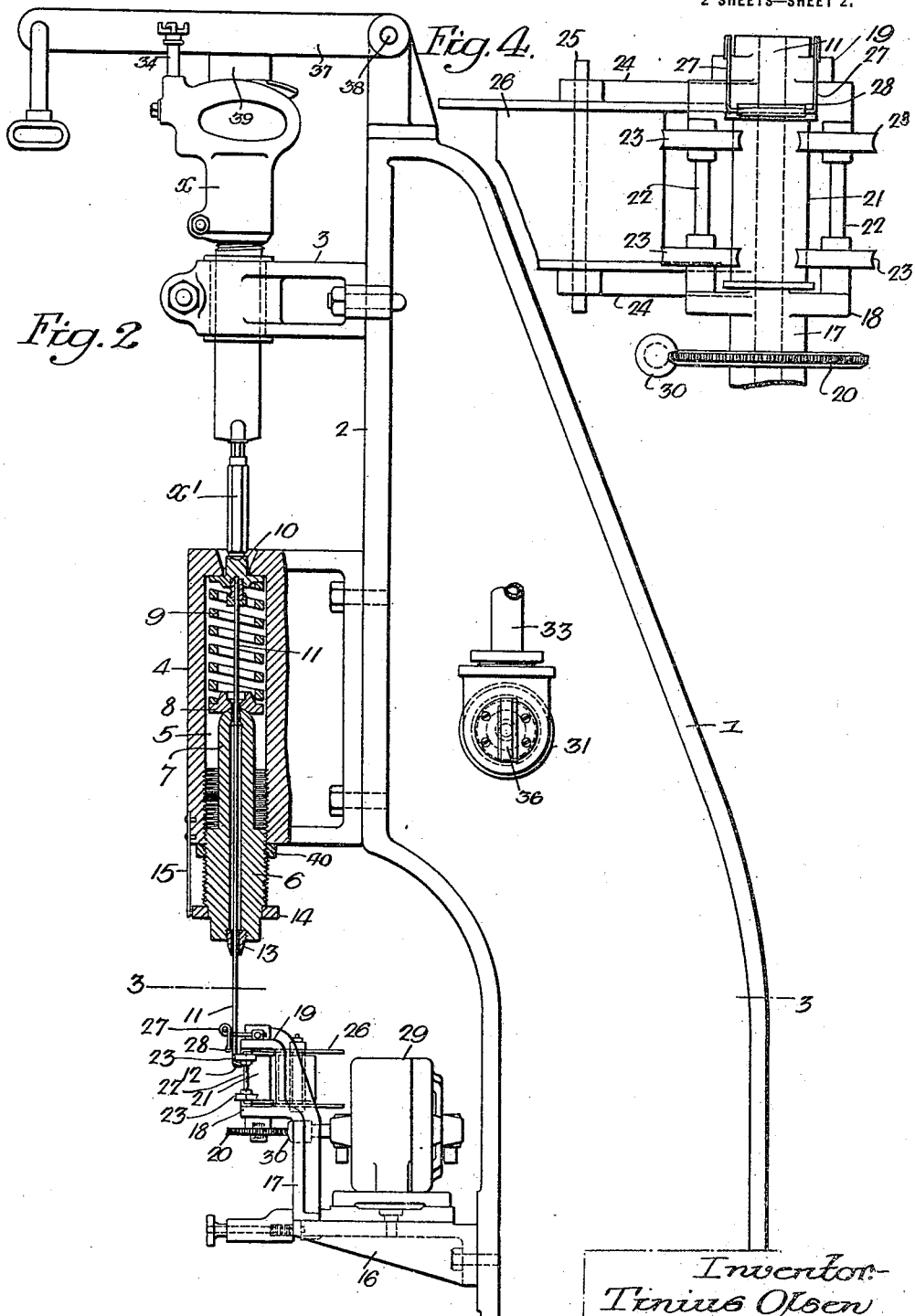

TINIUS OLSEN, OF PHILADELPHIA, PENNSYLVANIA, ASSIGNOR TO TINIUS OLSEN TESTING MACHINE COMPANY, OF PHILADELPHIA, PENNSYLVANIA, A CORPORATION OF PENNSYLVANIA.

HAMMER-TESTING MACHINE.

1,375,604.  Specification of Letters Patent.  Patented Apr. 19, 1921.

Application filed December 16, 1919. Serial No. 345,198.

*To all whom it may concern:*

Be it known that I, TINIUS OLSEN, a citizen of the United States, residing in Philadelphia, Pennsylvania, have invented Hammer-Testing Machines, of which the following is a specification.

One object of my invention is to provide a relatively simple and convenient machine for giving a graphic representation of the operative condition and working performance of tools such as pneumatic hammers which deliver a rapid succession of blows upon a chisel, hammer or die; the invention contemplating novel means for reducing and directing the force of the blows delivered so as to actuate a recording element in such a manner as to permit a continuous record to be obtained which shall be indicative of the performance or condition of the tool under test.

Another object of my invention is to provide a novel form of transmitting and reducing mechanism for interposition between a rapidly reciprocated element such as a die, chisel or other implement actuated by a pneumatic tool, and a recording stylus; the arrangement of parts being substantial, durable, and capable of giving an accurate representation of the performance of a tool under test.

I also desire to provide a testing machine of the character noted which shall include mechanism for permitting the quantity and pressure of the air used in a test to be conveniently determined.

These objects and other advantageous ends I attain as hereinafter set forth, reference being had to the accompanying drawings, in which, Figure 1 is a front elevation of a testing machine embodying my invention;

Fig. 2 is a side elevation, partly in vertical section, further illustrating the testing machine shown in Fig. 1;

Fig. 3 is a plan partly in section on the line 3—3, Fig. 2;

Fig. 4 is a front elevation of the record supporting mechanism; and

Fig. 5 is a fragment of a strip showing a form of record made by my machine.

In the above drawings 1 represents a suitable supporting frame in the form of a vertically extending flanged beam preferably having a flat vertical face 2 to which is bolted or otherwise fixed a two part or other suitable form of bracket 3, designed to guide and laterally support a pneumatic or other tool $x$ to be tested so that its axial line is substantially vertical. At a suitable distance below the bracket 3 I mount on the flat face 2 of the frame a casing 4 having a cylindrical cavity 5 provided with a relatively small opening into its upper end and having a bushing 6 adjustably threaded into its lower end. The upper portion of said bushing is formed with a cylindrical extension 7 of reduced diameter having its upper end spherically convex and designed to fit into the spherically curved socket of a plate 8 in engagement with the lower end of a coil spring 9. Said bushing is fixed in any adjusted position by a jam nut as shown.

The upper end of this spring acts upon a second plate 10 having an extension projecting into and partly through the opening in the upper end of the casing structure 4 and preferably provided with a depression in its upper surface for the reception of the lower end of the tool $x^1$ forming part of or actuated by the device $x$ to be tested.

The bushing 6 and its extension 7 are centrally bored to permit of the passage of a rod 11 whose upper end is rigidly fixed to the plate 10 and whose lower end 12 is turned at right angles to form or receive a recording stylus, the diameter of this rod being preferably considerably less than that of the passage through the bushing 6 which at its lower end is provided with a guiding member 13 more closely filling said rod. The lower end of the bushing has fixed to or formed integral with it a flange or collar 14 designed to coöperate with a graduated strip 15 projecting downwardly from the front of the lower end of the casing structure 4 in such manner that it gives an indication of the tension of said spring. It is thus possible to set the bushing to cause it to exert any desired pressure on the spring and hence on the plate 10.

For recording the performance of the machine I provide on the lower portion of the frame 3 a table or bracket 16 having an upwardly projecting standard 17. This latter has two laterally projecting portions 18 and 19 extending one above the other and providing bearings for a vertical spindle 19 to which are fixed a worm wheel 20 and a drum 21. These elements 18 and 19 also provide bearings for a pair of vertical spindles 22 each carrying a pair of concave pressure or guide rolls 23 in engagement with the surface of the drum 21. Projecting laterally from the upper part of the standard or bracket 17 are also provided a pair of arms 24 arranged one above the other for the reception of a vertical pin or spindle 25 on which is mounted the supply roll or reel 26 carrying the paper strip or ribbon for a record.

The drum 21 is so placed that the stylus end 12 of the rod 11 will engage the upper part of such a paper strip where it lies in contact with the upper part of said drum between the two pairs of pressure rolls 23, and in order that the rod 11 may remain in such a position as to cause its stylus end 12 to at all times engage the strip regardless of the vibration of the machine incident upon the operation of the tool $x$ under test, I preferably so mount a spring wire pressure device 27 that it at all times tends to hold the stylus in its recording position. This pressure device preferably consists of a single length of spring wire bent so that its end portions are parallel and fastened to the upper part of the structure 19. From this they project outwardly and after being each given at least one coil, are extended downward. These parallel side portions are then united in a transverse length or run which extends adjacent and parallel with the rod 11 immediately above its stylus end, and on this transverse portion I mount a pad of rubber or other shock absorbing material 28 preferably in the form of a tube.

The worm wheel 20 is designed to be driven at a suitable speed from any suitable source of power such as an electric motor 29 supported on the table bracket 16 and having a worm 30 fixed to its armature shaft in such a position as to mesh with its worm wheel. In order to supply the tool under test with air under a substantially constant pressure I mount in a suitable position on the frame 1 a reservoir 31 having connected to it a meter 36 for measuring the volume of air flowing to the tool under test. Said reservoir has a connection 32 to a source of supply of compressed air and an outlet 33 from the meter 36, is connected by a suitable flexible conduit (not shown) to the inlet fitting 34 of said tool. The presence of this reservoir immediately adjacent the tool regulates and tends to maintain constant the supply of air delivered thereto, and in order to ascertain the pressure at which this air is delivered a suitable gage 35 is connected to it in position to be easily observed.

In making a test of the particular pneumatic tool such as a hammer for example, the latter is placed in the guide 3 with a power transmitting bar $x^1$ extending between its tool holding portion and the plate 10 in whose concavity the lower end of said bar rests. By suitably turning the nut 14 the tension of the spring 9 is adjusted to regulate the movement of the stylus in accordance with the tool under test. Said sleeve 6 is retained in any given position by a suitable jam nut 40 as indicated by the part 14 relatively to the indicating strip 15. A strip of paper $x^2$ from the reel 26 is led between the first pair of pressure rolls 23 and the drum 21 and is then run from said drum under the second pair of said rolls, and the tool is pressed downwardly with a force similar to that ordinarily applied under conditions of use, by a lever 37 fulcrumed to the top of the frame 1 at 38 and extending over the upper end of the machine $x$. A shock absorbing pad or block 39 is placed between the tool and the lever 37 whose outer or free end has a handle 41 for the attachment of a weight or the application of hand power. After a suitable downward force has been applied through the lever 37 the tool $x$ is put in operation so that its rapid reciprocations are transferred through the member $x^1$ and plate 10 to the rod 11, with the result that its stylus end 12 is given a rapid vertical reciprocating movement each outward or downward stroke of the hammer piston moving it downwardly and the spring 9 immediately thereafter moving it up.

If now the electric motor 29 be put in operation motion is transmitted through the worm 30 and worm wheel 20 to the drum 21, so that the strip of paper is fed from the reel under the stylus point 12. The latter thereupon makes on said strip a series of practically vertical, somewhat wavy lines, connected by inclined lines and usually more or less broken. The length of these vertical lines is indicative of the general performance of the tool, and for purposes of comparison a record is first made of a tool which is known to be in perfect working condition. Other similar tools thereafter tested will give records which will at once indicate whether or not there is leakage in the valve mechanism or cylinder of the tool under test and will also show whether or not there is any irregularity in the action of the apparatus or any condition at variance with that shown by the record of the standard instrument. The performance of any tool under test is likewise compared with that of a standard instrument by comparing the quantities of air consumed in a given time, as shown by the gage 35 and meter 36.

I claim:—

1. The combination in a machine for testing pneumatic tools of a frame for supporting such a tool and including an abutment; a spring mounted between said abutment and the actuated member of the tool; means for pressing the tool toward the spring; a stylus; means for causing the stylus to be actuated by operation of the tool; and means for recording the movement of the stylus.

2. The combination in a machine for testing pneumatic tools of a frame for supporting a tool including an abutment; a member mounted to be operated on by the moving element of the tool; a spring mounted between said member and the abutment; a stylus connected to said member; and means for receiving a record made by the stylus.

3. The combination of a frame; means for supporting thereon a tool including a movable element; an adjustable abutment on the frame; a spring mounted between the movable element of the tool and said abutment; a device for forcibly pressing the tool toward the abutment; a stylus; means for causing the stylus to be moved in one direction by the tool and in the opposite direction by the spring; with means for receiving a record made by the stylus.

4. The combination of a frame including means for supporting a tool including a movable element; a spring casing carried by the frame; a spring supported by the casing; a member mounted between the moving element of the tool and said spring; means for adjusting the tension of the spring; and means for recording the movement of said member under the action of the tool.

5. The combination of a frame; means for supporting thereon a tool having a movable element; a spring casing carried by the frame; a sleeve threaded in said casing; a plate mounted to be engaged by the movable element of the tool; a spring confined between said sleeve and said plate; and means for recording the movement of the plate under the action of the tool.

6. The combination of a frame; means for supporting thereon a tool having a movable element; a spring casing carried by the frame; a sleeve threaded in said casing; a plate mounted to be engaged by the movable element of the tool; a spring confined between said sleeve and said plate; means for recording the movement of the plate under the action of the tool consisting of a rod connected to the plate and extending through the sleeve; and a device for recording the movement of said rod.

7. The combination of a frame having a tool holding portion; a member placed to be engaged by the movable element of the tool under test; a spring supporting said member; a rod connected to said member and having a laterally extended portion; with a device for feeding a body of paper at right angles to the general direction of movement of said rod.

8. The combination in a device for testing a tool having a movable element, of a frame; means thereon for supporting the tool under test; a device for recording the characteristics of the reciprocatory movement of the actuated element of said tool; and means for forcibly pressing the tool toward said device.

9. The combination in a device for testing a tool having a movable element, of a frame; including a guide through which the tool under test is slidable; a device for recording the characteristics of the reciprocatory movement of the actuated element of the tool; and means for pressing the tool toward said device.

10. The combination in a device for testing a tool having a movable element, of a frame; means for supporting the tool under test; a device for recording the characteristics of the reciprocatory movement of the actuated element of said tool; and means for forcibly pressing the tool toward said device; consisting of a lever fulcrumed on the frame and operative on the tool.

11. The combination of a supporting frame; a spring casing mounted thereon; a plate mounted in the casing in position to be engaged by the movable element of the tool under test; a rod connected to said plate; means for recording the movement of the rod; a sleeve threaded in the casing and guiding said rod; with a spring confined between said sleeve and said plate.

TINIUS OLSEN.